United States Patent [19]

Strickland

[11] 3,909,624
[45] Sept. 30, 1975

[54] SPLIT-RING MARX GENERATOR GRADING

[75] Inventor: Daniel M. Strickland, Belvedere, S.C.

[73] Assignee: The United States of America as represented by the Secretary of the Air Force, Washington, D.C.

[22] Filed: Aug. 7, 1974

[21] Appl. No.: 495,472

[52] U.S. Cl. .............................. 307/110; 174/144
[51] Int. Cl.² .................... H02M 3/18; H01B 17/44; H01T 17/00
[58] Field of Search...... 174/140 R, 140 CR, 141 R, 174/144; 307/110

[56] References Cited
UNITED STATES PATENTS

| | | | |
|---|---|---|---|
| 3,252,054 | 5/1966 | Hilgarth et al. | 174/140 R |
| 3,643,105 | 2/1972 | Bantz et al. | 307/110 |
| 3,832,569 | 8/1974 | Anderson et al. | 307/110 |

*Primary Examiner*—Stuart N. Hecker
*Attorney, Agent, or Firm*—Joseph E. Rusz; Henry S. Miller, Jr.

[57] ABSTRACT

Metallic tubing bent to a shape consistent with the cross-sectional shape of a Marx generator, tubing is split into two symmetrical halves and insulated; two halves combined have an initial DC potential equal to one stage voltage, after erection of the Marx the potential collapses to zero.

1 Claim, 4 Drawing Figures

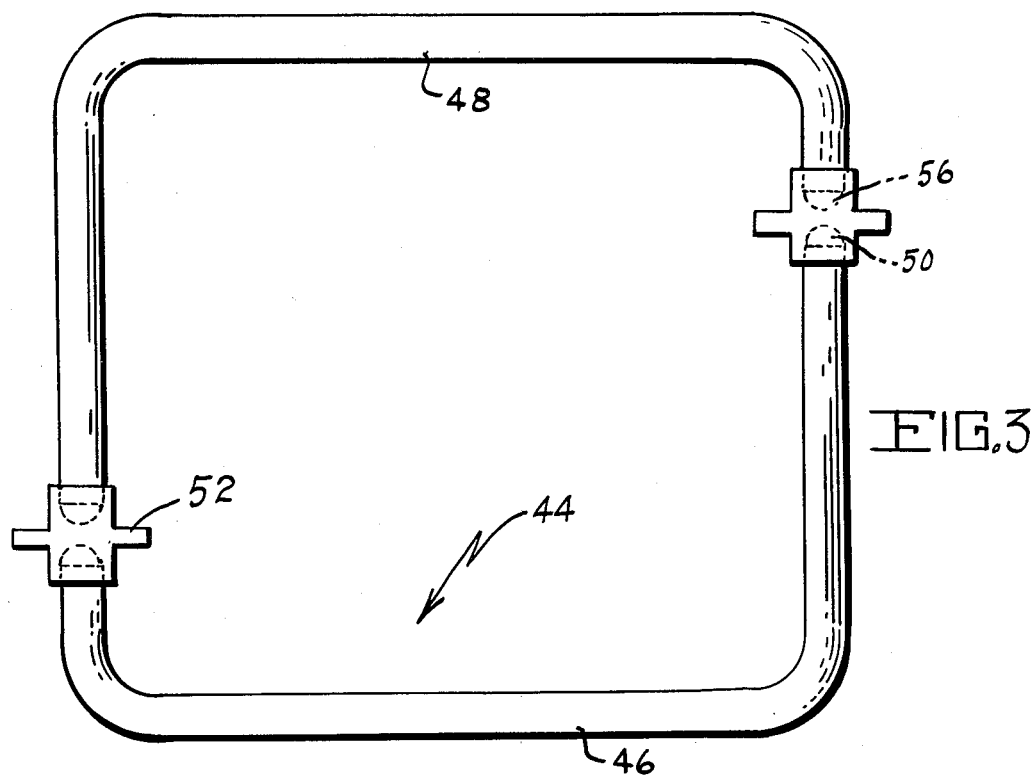
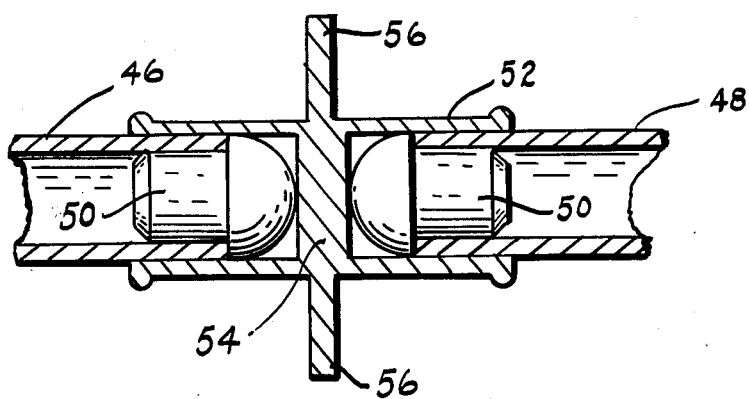

SPLIT-RING MARX GENERATOR GRADING

BACKGROUND OF THE INVENTION

This invention relates generally to electromagnetic pulse generators and more specifically to grading rings for the Marx generator.

In order to produce extremely high voltages for a short time period, it is well known that banks of capacitors provide a series source with a rapid rise time capable of producing a million volts or more. Accurate control over such systems is often provided by a spark gap switching arrangement which allows rapid discharge of individual capacitors and consequently a fast rise time.

Electromagnetic pulse generators using the bank series concept must include means of controlling transient electrical stress along the dimensions of the generator. One method of controlling stress is the utilization of specially designed grading rings.

Previously known grading ring designs involved the use of a solid ring that encircircled each capacitor and consequently resulted in each stage ring operating at a single potential. As a result, their utility for purposes of connecting charging resistors and transient current limiting resistors was, at best, limited to only one half the electrical circuit, in the Marx generator. Further, during erection of the capacitor banks, side currents are produced which give rise to ringing transient voltages between the known grading rings which are detremental to the assembly and function of the generator.

To eliminate the effects of extranious voltages that are induced, produced or otherwise caused, resistors were placed in strategic locations to control and limit the potentials. However, in known systems such resistive means have to be formed as part of the complex circuitry which gave them limited effectiveness and little design flexibility.

The invention described herein overcomes the disadvantages of the prior art and provides a pulse generator for use where flexibility of design, precise electrical grading and ease of maintenance are important.

SUMMARY OF THE INVENTION

The invention involves a new and improved grading ring particularly suited for use with the Marx electromagnetic pulse generator, however, not limited exclusively to use therewith. In its generic form the grading ring is tubular and formed to be consistent with the cross-sectional shape of the generator. For example, a Marx generator utilizing rectangular capacitors in a stacked configuration, the grading rings would be rectangular.

The rings, contrary to prior practice, would be formed in two half pieces, with each half identical to the other. In assembly, the halves are joined to encircle the capacitor, however, the halves are electrically isolated from each other. Electrical isolation allows the halves of the ring to have a combined initial DC potential equal to one stage voltage which after erection of the generator collapses to zero.

The half rings may now be connected to charging resistors and transient current limiting resistors and operate at different potentials thereby permitting the grading rings to be utilized in the full Marx electrical circuit. Single sold rings were limited to operating at only one half the Marx electrical circuit. In the invention each section is connected respectively to the top and bottom of the same Marx switch thereby ensuring that after the Marx erection the sections assume the same potential and provide the required transient grading.

It is therefore an object of the invention to provide a new and improved electromagnetic pulse generator grading ring.

It is another object of the invention to provide a new and improved electromagnetic pulse generator grading ring that functions on a plurality of voltages.

It is a further object of the invention to provide a new and improved electromagnetic pulse generator grading ring that is mechanically rugged.

It is still another object of the invention to provide a new and improved electomagnetic pulse generator grading ring that is simple to install and maintain.

It is still a further object of the invention to provide a new and improved electromagnetic pulse generator ring that is more simply controlled then any hitherto known.

It is another object of the invention to provide a new and improved electromagnetic pulse generator ring that controls erection transient overvoltages.

It is another object of the invention to provide a new and improved electromagnetic pulse generator grading ring that may be used with compact, high density Marx type generators.

It is another object of the invention to provide a new and improved electromagnetic pulse generator ring which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawings.

DESCRIPTION OF THE DRAWINGS

FIG. 3 is a top view of the grading ring of the invention.

FIG. 4 is a side elevation view, partly in section of the insulating means of the invention.

DESCRIPTION OF THE PREFERRED EMBODIMENT

Figure 1:
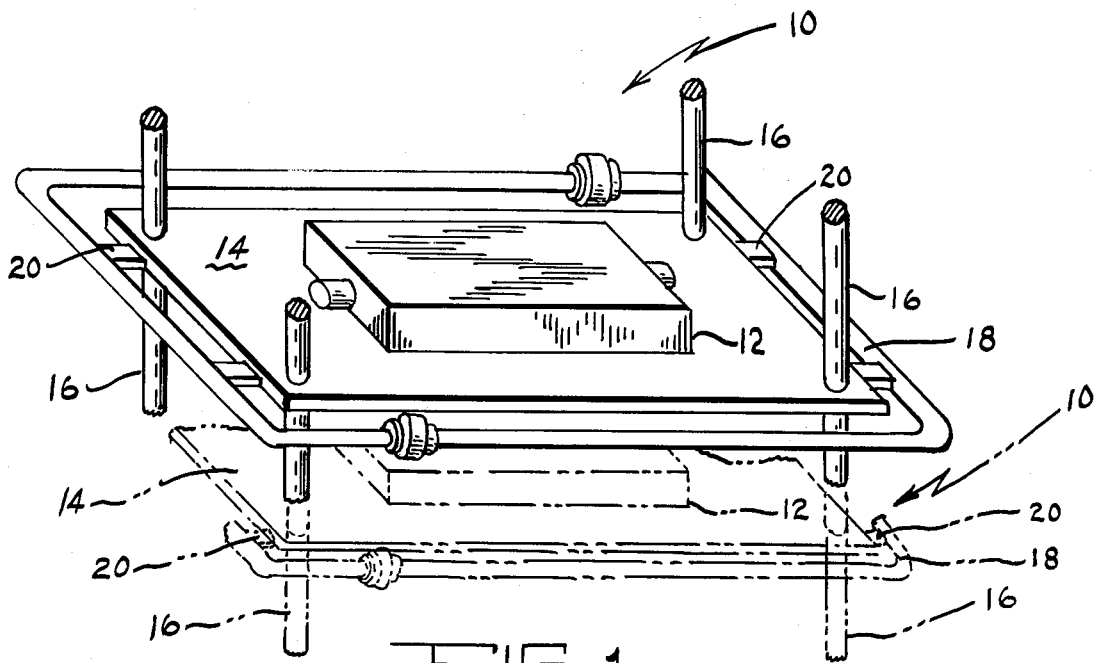
FIG. 1 is a schematic representation of a Marx generator system.

Referring now to FIG. 1, there is shown a section of a Marx electromagnetic pulse generator generally at 10. The generator is formed of banks of capacitors 12 located on suitable bases 14 and placed in a stacked relationship. The size and number of capacitors dependent upon the desired output voltage. The capacitors are located and secured by poles 16 of insulating material such as fiberglass. Grading rings 18 encircle the capacitor 12 and are secured by nylon pins 20 to the base 14.

Figure 2:
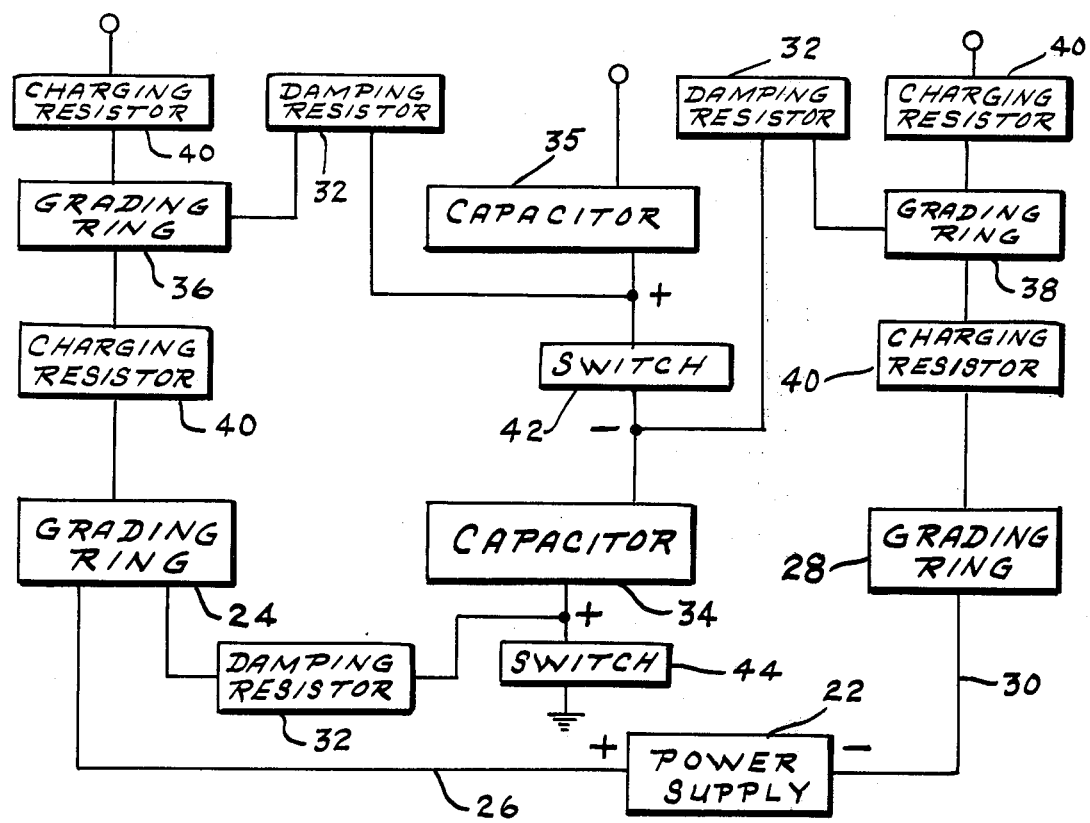
FIG. 2 is a block diagram of an electrical circuit suitable for use in the invention.

Concerning FIG. 2, the electrical power supply 22 provides an output to half the grading ring 24 via line 26 and half the grading ring 28 via line 30. Charging resistors 40 are connected between grading rings 24, 28 and 36, 38 for charging purposes.

Between the capacitors 34, 35 and the grading rings 24, 36 and 38 are connected damping resistors 32 to insure that erection transients do not produce serious overvoltages which could cause arcing between the grading rings. The spark gap switch 42 connects the capacitors to allow for rapid discharge and fast rise time in the output from the generator. A half voltage switch 44 is connected between the capacitor and ground. Due to the nature and design of the grading rings it is possible to use such appropriate techniques as soldering, clamping or threaded sheet metal inserts for connecting the limiting and transient current limiting resistors to the rings.

FIG. 3 shows a top view of the invention which may be constructed from electrically conductive tubing generally shown at 44. The tube-like material is formed in a shape consistent with the cross-sectional shape of the generator to which it is applied. Two halves 46, 48 are utilized to complete the ring, shown in the figure as a rectangle. Each half is sealed with a dome shaped cap 50 to prevent arcing from the otherwise sharp edges of tube-like material. Between the half rings are ring spacers 52 which secure and align the rings. The ring spacers are fabricated from any high dielectric-strength material and may be molded as one piece or formed by securing several pieces together. The ring spacers provide a snug, friction-fit around the grading rings to insure proper alignment. To minimize field enhancement at the corners of the ring, the bend radius is large enough to preclude crimping of the tube if fabricated by tube bending means.

In FIG. 4, the two halves of the grading ring are shown at 46 and 48. The dome shaped plugs 50 fit securely into the grading ring. The plugs may be fabricated from the same material as the ring or other suitable conductive material. The spacer 52 surrounds the ring with a snug friction fit and separates the ends of the ring with a relatively thick dielectrical buffer 54. The buffer extends past the outside of the spacer at 56 to decrease any possibility of arc-over during operation of the generator.

Although the invention has been described with reference to a particular embodiment, it will be understood to those skilled in the art that the invention is capable of a variety of alternative embodiments within the spirit and scope of the appended claims.

What is claimed is:

1. A grading ring for distributing transient electrical stress along the longitudinal axis of an ultrahigh voltage electromagnetic pulse generator, including a plurality of capacitors in stacked relationship, power supply means for charging the capacitors, spark gap switching means connecting the capacitors, grading rings encircling each capacitor, charging resistors connected between each grading ring and damping resistors connected between the grading rings and the capacitors comprising: a first tube-like member configurated to conform to the shape of half the cross section of the generator; a second tube-like member formed symmetrical in all dimensions to the first said tube-like member; plug means mounted in each end of the first and second tube-like members, and a cylindrically shaped dielectric spacer means adapted to accept one end of each of said first and second members and having a dielectric baffle centrally positioned to separate said members and extending beyond the diameter of the spacer means.

* * * * *